United States Patent [19]

Cuny et al.

[11] Patent Number: 4,527,038
[45] Date of Patent: Jul. 2, 1985

[54] WELDING TORCH WITH NON-CONSUMABLE ELECTRODE AND DOUBLE SHIELDING GAS FLOW AND THE RELEVANT WELDING PROCESS

[75] Inventors: Francis Cuny, Mezy-sur-Seine; Louis Auzary, Paris, both of France

[73] Assignee: L'Air Liquide, Societe Anonyme Pour L'Etude et L'Exploitation des Procedes Georges Claude, Paris, France

[21] Appl. No.: 465,774

[22] Filed: Feb. 11, 1983

Related U.S. Application Data

[63] Continuation-in-part of Ser. No. 433,242, Oct. 7, 1982, abandoned.

[30] Foreign Application Priority Data

Oct. 14, 1981 [FR] France ................................ 81 19295

[51] Int. Cl.³ .................................................. B23K 9/16
[52] U.S. Cl. .......................................... 219/75; 219/74; 219/137 R
[58] Field of Search ....................... 219/75, 74, 72, 122, 219/137 R

[56] References Cited

U.S. PATENT DOCUMENTS

| | | | |
|---|---|---|---|
| 2,686,860 | 8/1954 | Buck et al. ........................ | 219/74 X |
| 3,349,215 | 10/1967 | Wagenleitner et al. .............. | 219/74 |
| 3,495,066 | 2/1970 | Broyard et al. ..................... | 219/74 |
| 3,496,323 | 2/1970 | Lesnewich et al. .................. | 219/74 |
| 4,161,645 | 7/1979 | Shimada et al. .................... | 219/75 X |

OTHER PUBLICATIONS

Cary, Howard B., *Modern Welding Technology*, (1970), pp. 356–360.

Primary Examiner—Roy N. Envall, Jr.
Assistant Examiner—C. M. Sigda
Attorney, Agent, or Firm—Lee C. Robinson, Jr.

[57] ABSTRACT

In order to improve electric arc penetration of an arc welding torch, the angles of convergence $\alpha$ and $\beta$ of a sleeve and a nozzle of the torch are selected within an area which is inscribed in a quadrangular figure defined by the coordinates ($\alpha$, $\beta$) with corners, or apices, at the four following points:

| | |
|---|---|
| $S'_1$: | $\alpha = 17.5$ degrees<br>$\beta = 27.5$ degrees |
| $S'_2$: | $\alpha = 7.2$ degrees<br>$\beta = 20$ degrees |
| $S'_3$: | $\alpha = 7.5$ degrees<br>$\beta = 15$ degrees |
| $S'_4$: | $\alpha = 17.5$ degrees<br>$\beta = 7.5$ degrees |

The disclosed arc welding torch is favorably employed in an inert gas welding process.

14 Claims, 2 Drawing Figures

WELDING TORCH WITH NON-CONSUMABLE ELECTRODE AND DOUBLE SHIELDING GAS FLOW AND THE RELEVANT WELDING PROCESS

This is a continuation-in-part of our U.S. patent application Ser. No. 433,242, filed Oct. 7, 1982, now abandoned.

The present invention concerns an electric arc welding torch with a non-consumable electrode and located axially and with a double shielding gas flow system of the type which consists of (1) a first annular passage surrounding the electrode and surrounded itself by a concentric sleeve, this first passage having a width, measured along a radius, in the range 0.5 to 1.5 mm; and (2) a second annular passage which is concentric to the first and which separates the sleeve from a torch nozzle.

In this type of welding torch (see, e.g., French Pat. No. 2,243,770) the central gas flow path is narrow and the flow speed itself is relatively high. This generally results in the confinement of the electric arc. Within a certain range of flow rates, and with a very regular flow speed and a thorough cooling of the sleeve, the central flow of gas is then channelled to such an extent that it assumes a laminar configuration around the arc. Consequently, the gas flow is efficiently confined, resulting in improved electric arc stability and increased power of penetration. Owing to this stabilization of the electric arc, good reproducibility of the welding seams can be achieved.

To arrive at such results, the flow rate of the central gas supply must remain relatively moderate, so that this gas is not sufficient to shield the whole melting bath from oxidizing. This shielding is achieved by the peripheral gas flow which travels through the second annular passage. Under the conditions described above, any turbulences which may occur in the peripheral gas flow will not noticeably affect the laminar-shaped central gas flow.

With known welding torches of the type under consideration, excellent results have been achieved with heavy duty automatic welding equipment where the strength of the welding current plays a predominant role. Conversely, in the case of manual welding with lower welding current strengths (less than 150 Amps) the Applicant has expressed the assumption that other parameters could have an influence on the final results of the welding process and particularly on the power of penetration by the electric arc.

The purpose of the present invention is to provide a welding torch which will be perfectly suited to manual welding operations while retaining its full suitability for automatic welding.

To this effect, the present invention covers a welding torch of the type described as above and being improved thereover in that said second annular passage is generally shaped in to taper down between the outer wall of the sleeve at an angle of convergence $\alpha$ and the inner wall of the nozzle at an angle of convergence $\beta$, both angles of convergence $\alpha$ and $\beta$ having been selected from a system of rectangular coordinates where the value of the angle of convergence $\alpha$ is shown in abscissa and the value of the angle of convergence $\beta$ in ordinate, within a quadrangle defined by its four apexes $S'_1, S'_2, S'_3, S'_4$ as follows:

$S'_1$:
 $\alpha'_1 = 17.5$ degrees
 $\beta'_1 = 27.5$ degrees $S'_2$:
 $\alpha'_2 = 7.5$ degrees
 $\beta'_2 = 20$ degrees $S'_3$:
 $\alpha'_3 = 7.5$ degrees
 $\beta'_3 = 15$ degrees $S'_4$:
 $\alpha'_4 = 17.5$ degrees
 $\beta'_4 = 7.5$ degrees Another feature of certain embodiments of the invention resides in the fact that the ratio $D_2/D_1$, in which $D_2$ is the outside diameter (O.D.) of the sleeve 2 at the end thereof and $D_1$ is the inside diameter (I.D.) of the sleeve at the end thereof, is selected to be between 1.6 and 2.1. Preferably, the value of the ratio $D_3/D_2$, in which $D_3$ is the I.D. of the nozzle 7 at the end thereof, should also be selected between 1.6 and 2.1. Thus the optimum conditions will be created for the flow of the peripheral gas supply and its proper mixing with the central gas supply.

It has been observed by the Applicant that distance X travelled by the peripheral gas flowing between nozzle and sleeve without encountering any other obstacle than a progressive reduction of the cross-section of the passage will also be a factor influencing the results of the welding process. Optimally, this distance X is at least 13 mm.

It is a further advantage to have the tip of the electrode protrude out of the sleeve by 3 to 15 mm, and preferably by 3 to 6 mm.

Another purpose of the invention is to provide an electric arc welding process using a welding torch conforming to the above description. In this welding process, a difference of electric potential is created between a workpiece and the electrode of the welding torch while feeding into the first passage as mentioned above an inert gas which may contain hydrogen to an extent which is not to exceed 10%, and simultaneously feeding into the second passage an inert gas which may contain a metallurgically active gas.

In order to arrive at a correct interpretation of the results deriving from the present study, a description of the test conditions as well as a definition of the criteria used to evaluate the quality of the welding seams will be necessary.

The test pieces have thicknesses of 1.5, 3, and 4 mm. They are made of grade XES carbon steel (thickness 1.5 mm), grade TC (thickness 3 mm) and grade 10C (thickness 4 mm) as designated by French Standards A 36 301 and A 36 401.

All test pieces were scoured before the tests in order to avoid projection of scale deposit particles onto the tungsten electrode of the welding torch. The test pieces were 250×80 mm in size and the edges to be welded were not bevelled. Prior stitch welds were made using the TIG welding process without filler metal. The latter was only used to weld the 3 and 4 mm thick test-pieces. Filler metal consisted of a metal rod having the following composition: $C \leq 0.08\%$; $Cr = 0.5\%$; $Mo = 0.5\%$; $S = 0.03\%$; $P = 0.03\%$. Diameter of the filler metal rod was 2 mm. The welding and shielding gasses used were a mixture of argon with 5% hydrogen for the central gas flow and pure argon for the peripheral gas flow.

The tests were carried out using horizontal manual welding. On the occasion of each test, the welding time was recorded in order to determine global welding speed (V).

Five criteria were used to evaluate the quality of the welding:
- Penetration power of the electric arc;
- Electric arc stability;
- Curvature of the welding seam surface;
- Regularity of the seam at the top side; and
- Regularity of the seam at the reverse side.

These criteria may be briefly clarified as follows:

The power of penetration of the electric arc is in direct ratio to:
(i) the welding speed (V) and
(ii) the width (lv) of the welding seam on the reverse side, and is inversely proportional to:
(iii) the width (ld) of the welding seam on the top side.

Consequently, the global value which has been taken into consideration is the result of the formula: $V \times lv \times ld$, it being understood that whenever the value of $lv \times ld$ was exceeding 1, this value has been brought down to 1 in order not to favour certain welding seams exceptionally showing a width larger on the reverse side than on the top side.

In order to facilitate evaluation of the test results, three levels of quality were adopted as regards the power of arc penetration:
- Good (++)
- Acceptable (+)
- Poor (0)

With reference to electric arc stability, it is indicated that an arc is considered to be stable when its position in space does not vary during the whole testing process. Here again three levels of quality were adopted:
- Good (++): no instability
- Acceptable (+): a few slight variations of stability
- Poor (0): marked symptoms of instability eventually causing the fusion of the edges of the test pieces to get completely out of control.

As regards the curvature of the top surface of the welding seam this is measured in terms of the maximum height of the welding seam over the plane of the test piece. It is moreover indicated that such curvature is a guarantee against possible mechanical weaknesses resulting from a decreased cross-section of the seam. It consequently stands to reason that for any negative curvature (depressed section) of the welding seam, the weld quality is to be penalized.

Again, three levels of appreciation were taken into consideration:
- Good (++): welding seam featuring a clearly recognizable and uniform positive curvature.
- Acceptable (+): welding seam flat or showing a positive curvature only locally
- Poor (0): welding seam with depressed sections in several places Note: No marks were given under this heading to the 1.5 mm thick test pieces as in this case the welding operations were carried out without filler metal.

As for the regularity of the welding seam on the top side as well as on the reverse side of the joint, this is evaluated according to the straightness of the weld (proper allowances being made for "accidents" resulting from the manual welding mode). The evaluation in this case is quite subjective and three levels of appreciation have been retained:
- Good (++)
- Acceptable (+)
- Poor (0)

Explanation of the invention is now given by the following description of an embodiment, which makes references to the appended drawing Figures.

Figure 1:
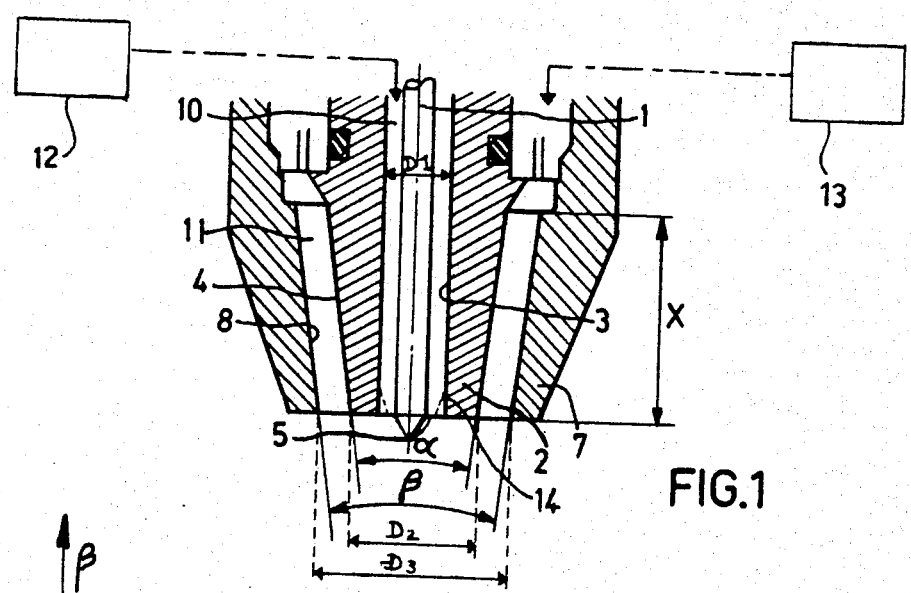
FIG. 1 is an axial cross-section of a welding torch embodying the present invention.
Figure 2:
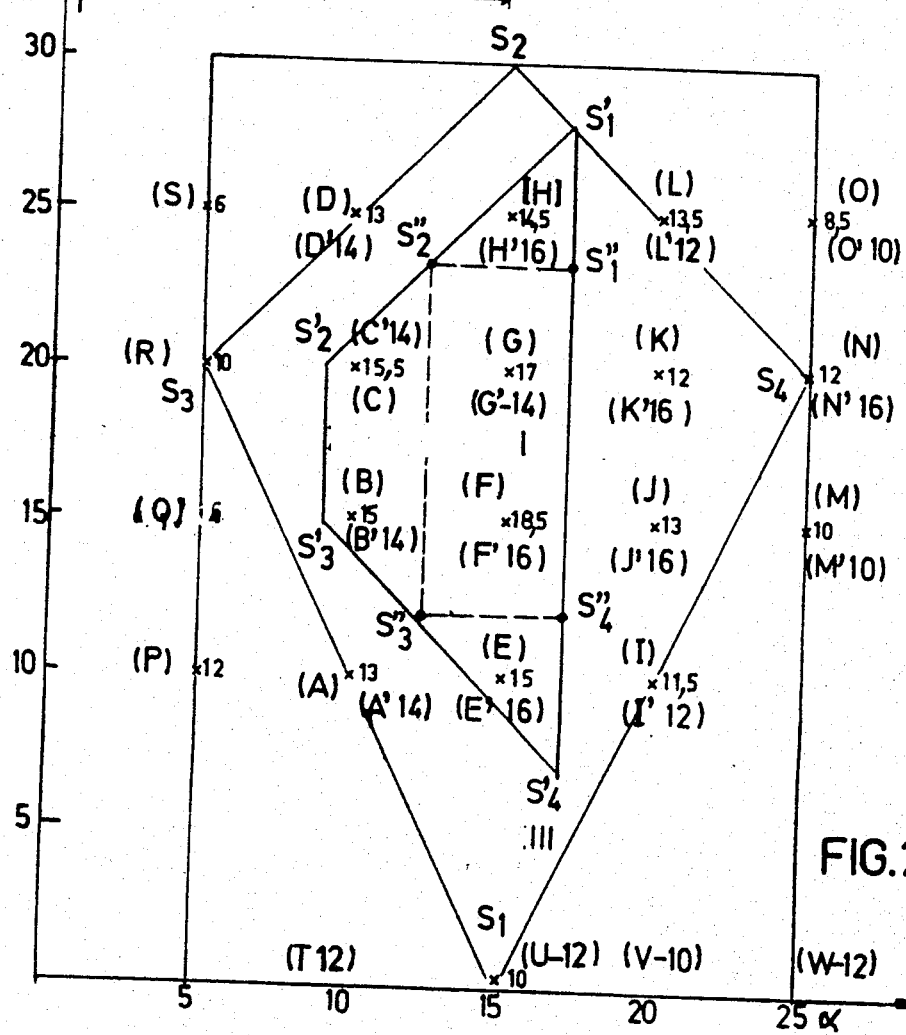
FIG. 2 is a diagram which determines an optimum area for the selection of the value to be given to angles $\alpha$ and $\beta$ as well as a preferential area containing the values with which excellent results are achieved.

With reference to FIG. 1, a welding torch embodying the present invention includes an axially placed tungsten electrode 1 surrounded by a coaxial sleeve 2 at a distance (in diameter) varying from 1 to 3 mm. The inside wall 3 of the sleeve is cylindrical while its outside wall 4 tapers down (at an angle $\alpha$) towards the tip 5 of the electrode 1. The torch further includes a nozzle 7 which is a solid conical component having a tapered inner wall 8, the angle of taper $\beta$ being also oriented towards the tip of the electrode 1. The terminal faces of the sleeve 2 and the nozzle 7 are in the same plane which is perpendicular to the centerline of the torch. The electrode protrudes beyond that plane by a distance of 3 to 6 mm.

During a welding operation a shielding gas is introduced into an annular central passage 10 arranged between the electrode 1 and the sleeve 2 while a second shielding gas is introduced into an annular passage 11 arranged between the outer wall 4 of the sleeve 2 and the nozzle 7. To this effect, the passages 10 and 11 are connected to gas sources 12 and 13, respectively.

The outlet diameters, measured over passage walls 3, 4, and 8, are designated as $D_1$, $D_2$, and $D_3$ respectively, and the following ratios are verified:

$$1.6 \leq D_3/D_2 \leq 2.1$$

$$1.6 \leq D_2/D_1 \leq 2.1$$

In the present embodiment, the outer wall 4 of the sleeve 2 and the inner wall 8 of the nozzle 7 are purely conical over an axial distance X which is not less than 13 mm.

In the process of the tests, the results of which are given hereafter, the angles $\alpha$ and $\beta$ were given values which varied from 10 to 25 degrees (in 5-degree increments). In fact, for each successive value of angle $\alpha$: 10, 15, 20 and 25 degrees, tests were performed with angle $\beta$ values of 10, 15, 20 and 25 degrees with the exception of the 25-degree value of angle $\alpha$ against which a 10-degree value for angle $\beta$ did not prove feasible.

The results of these tests have been listed in the following Table I and correspond to test-pieces of 1.5, 3, and 4 mm thickness which have been arc welded with welding currents of 50, 80, and 86 Amps, respectively. These results are completed by the additional results of other tests which were made over a wider range of angle values, including $\alpha = 5$ (the results of which are given in Table II hereafter) and $\beta = 0$ degree, in order to confirm the rather accurate limits of the area containing the optimum values. It is to be noted that these additional tests were made using test-pieces of 4 mm thickness and an arc welding current of 86 Amps.

Within the passage 11, the flow rate of the gas, expressed in liters per minute, is of the same order of magnitude as the inside diameter $D_3$ of the nozzle 7 expressed in millimeters. Within the passage 10, this flow rate value is situated between 1.5 liter/minute (minimum value required to achieve electric arc confinement) and 4 liters/minute (maximum value with which to achieve a laminar-shaped flow). These values correspond to cases where the gas used for the test was either argon or a gas with a specific gravity close to that of argon. With a gas having a specific gravity of $d_{Ar}$ as against argon clearly different from 1, these values are to be multiplied by the factor: $1/\sqrt{d_{Ar}}$.

TABLE I

| CONDITIONS OF WELDING AND EVALUATION | | | | | | | | QUALITY OF THE ARC | | QUALITY OF WELDING SEAMS | | | GLOBAL RATING | |
|---|---|---|---|---|---|---|---|---|---|---|---|---|---|---|
| Angles | | | | | | | | | | | | | | |
| sleeve $\alpha$ | nozzle $\beta$ | e (mm) | v om/mn | ld (mm) | lv (mm) | $\frac{lv}{ld}$ | $v \times \frac{lv}{ld}$ | power of penetration | stability | weld curvature | regularity of seam Top | Reverse | Max rating 28 | Max. rating 20 |
| 10 | (A) | 1.5 | 15.3 | 4.5 | 4.5 | | 15.5 | + | 0 | | + | + | | |
| | 10 | 3 | 11 | 5.3 | 4.5 | | 9.5 | ++ | ++ | + | + | ++ | 18 | 13 |
| | | 4 | 6.6 | 6.5 | 5 | | 5 | + | ++ | ++ | ++ | 0 | | |
| | (B) | 1.5 | 18 | 4 | 4 | | 18 | ++ | ++ | | + | + | | |
| | 15 | 3 | 13 | 5 | 3.9 | | 10 | ++ | ++ | ++ | + | + | 21 | 15 |
| | | 4 | 6.6 | 5.5 | 4.5 | | 5.5 | + | ++ | + | ++ | + | | |
| | (C) | 1.5 | 16.8 | 4.5 | 4.5 | | 17 | ++ | ++ | | + | + | | |
| | 20 | 3 | 11.7 | 5.4 | 4.3 | | 9.5 | ++ | ++ | ++ | + | ++ | 22 | 15.5 |
| | | 4 | 6 | 6.8 | 5 | | 4.5 | 0 | ++ | + | ++ | ++ | | |
| | (D) | 1.5 | 13.2 | 5 | 5.5 | >1 | 13 | 0 | 0 | | + | + | | |
| | 25 | 3 | 11.4 | 5.5 | 4 | | 8.5 | + | ++ | ++ | ++ | ++ | 18 | 13 |
| | | 4 | 6 | 6.8 | 5 | | 4.5 | 0 | ++ | + | ++ | ++ | | |
| 15 | (E) | 1.5 | 15.3 | 4 | 4.5 | >1 | 15.5 | + | ++ | | ++ | ++ | | |
| | 10 | 3 | 8.5 | 6 | 5 | | 7 | 0 | ++ | + | + | ++ | 21 | 15 |
| | | 4 | 6 | 6.3 | 6.5 | >1 | 6 | ++ | ++ | 0 | ++ | ++ | | |
| | (F) | 1.5 | 18 | 3.5 | 4.3 | >1 | 18 | ++ | ++ | | ++ | ++ | | |
| | 15 | 3 | 11.7 | 5.3 | 4 | | 9 | ++ | ++ | ++ | ++ | ++ | 26 | 18.5 |
| | | 4 | 6.7 | 6 | 5 | | 5.5 | + | ++ | ++ | ++ | + | | |
| | (G) | 1.5 | 18 | 4.3 | 4.3 | | 18 | ++ | ++ | | ++ | ++ | | |
| | 20 | 3 | 9.2 | 5.3 | 5.3 | | 9 | ++ | ++ | + | ++ | ++ | 24 | 17 |
| | | 4 | 6 | 5.8 | 5.5 | | 5.5 | + | ++ | + | ++ | + | | |
| | (H) | 1.5 | 15.3 | 4.5 | 4.5 | | 15.5 | + | 0 | | ++ | ++ | | |
| | 25 | 3 | 8.8 | 6.4 | 5.1 | | 7 | 0 | + | + | ++ | ++ | 20 | 14.5 |
| | | 4 | 6 | 5.5 | 6.3 | >1 | 6 | ++ | ++ | + | ++ | + | | |
| 20 | (I) | 1.5 | 14.4 | 4.5 | 4.5 | | 14.5 | 0 | 0 | | + | + | | |
| | 10 | 3 | 10.5 | 5.6 | 4.5 | | 8.5 | + | + | ++ | ++ | ++ | 16 | 11.5 |
| | | 4 | 6 | 5.5 | 5.5 | | 6 | ++ | 0 | + | ++ | + | | |
| | (J) | 1.5 | 14.4 | 4.5 | 4.8 | >1 | 14.5 | 0 | + | | + | + | | |
| | 15 | 3 | 10.2 | 5.6 | 4.5 | | 8 | + | ++ | ++ | + | + | 18 | 13 |
| | | 4 | 6.6 | 5.8 | 4.5 | | 5 | + | ++ | ++ | ++ | + | | |
| | (K) | 1.5 | 13.8 | 4.5 | 5.5 | >1 | 14 | 0 | 0 | | ++ | ++ | | |
| | 20 | 3 | 9 | 6 | 5.3 | | 8 | + | ++ | 0 | + | + | 17 | 12 |
| | | 4 | 6.6 | 6 | 4.5 | | 5 | + | ++ | ++ | ++ | + | | |
| | (L) | 1.5 | 15.6 | 4.3 | 4.5 | >1 | 15.5 | + | + | | ++ | ++ | | |
| | 25 | 3 | 9.6 | 5.6 | 5 | | 8.5 | + | ++ | + | ++ | + | 19 | 13.5 |
| | | 4 | 6 | 6.4 | 5 | | 4.5 | 0 | ++ | + | ++ | + | | |
| 25 | (M) | 1.5 | 15.6 | 4.5 | 4 | | 14 | 0 | 0 | | ++ | ++ | | |
| | 15 | 3 | 8.5 | 6.6 | 5.1 | | 6.5 | 0 | ++ | + | + | + | 14 | 10 |
| | | 4 | 5.4 | 6.5 | 6.5 | | 5.5 | + | ++ | 0 | ++ | 0 | | |
| | (N) | 1.5 | 16.2 | 4 | 4 | | 16 | + | 0 | | + | + | | |
| | 20 | 3 | 10 | 5.9 | 4.9 | | 8.5 | + | ++ | + | + | 0 | 16 | 11.5 |
| | | 4 | 6 | 5.5 | 5.5 | | 6 | ++ | ++ | + | ++ | + | | |
| | (O) | 1.5 | 16.8 | 4.3 | 3.8 | | 15 | + | 0 | | + | + | | |
| | 25 | 3 | 9.3 | 6 | 4.6 | | 7 | 0 | ++ | + | + | 0 | 12 | 8.5 |
| | | 4 | 5.4 | 6.5 | 5 | | 4 | 0 | ++ | + | ++ | 0 | | |

TABLE II

| | CONDITIONS OF WELDING AND EVALUATION | | | | | | | QUALITY OF THE ARC | | QUALITY OF WELDING SEAMS | | | |
|---|---|---|---|---|---|---|---|---|---|---|---|---|---|
| | angles | | | | | | | Power of | | | regularity of | | |
| POINTS | Sleeve $\alpha$ | nozzle $\beta$ | v om/mn | ld (mm) | lv (mm) | $\frac{lv}{ld}$ | $v \times \frac{lv}{ld}$ | Penetration | Stability | Weld curvature | Top | seam Reverse | Max. rating 20 |
| P | 5 | 0 | 6 | 6.5 | 5.5 | | 5 | + | ++ | + | + | + | 12 |
| Q | | 15 | 5.4 | 6.5 | 4 | | 3.5 | 0 | ++ | + | 0 | 0 | 6 |
| R | | 20 | 6 | 7 | 5 | | 4.5 | 0 | ++ | + | + | + | 10 |
| S | | 25 | 6 | 6.5 | 4 | | 3.5 | 0 | ++ | + | 0 | 0 | 6 |
| T | 10 | 0 | 6 | 6 | 4 | | 4 | 0 | ++ | ++ | ++ | 0 | 12 |
| A' | | 10 | 6.6 | 6.5 | 5 | | 5 | + | ++ | ++ | ++ | 0 | 14 |
| B' | | 15 | 6.6 | 5.5 | 4.5 | | 5.5 | + | ++ | + | ++ | + | 14 |
| C' | | 20 | 6 | 6.8 | 5 | | 4.5 | 0 | ++ | + | ++ | ++ | 14 |
| D' | | 25 | 6 | 6.8 | 5 | | 4.5 | 0 | ++ | + | ++ | ++ | 14 |
| U | 15 | 0 | 6 | 6.5 | 5.5 | | 5 | + | ++ | 0 | + | + | 12 |
| E' | | 10 | 6 | 6.3 | 6.5 | >1 | 6 | ++ | ++ | 0 | ++ | ++ | 16 |
| F' | | 15 | 6.7 | 6 | 5 | | 5.5 | + | ++ | ++ | ++ | + | 16 |
| G' | | 20 | 6 | 5.8 | 5.5 | | 5.5 | + | ++ | + | ++ | + | 14 |
| H' | | 25 | 6 | 5.5 | 6.3 | >1 | 6 | ++ | ++ | + | ++ | + | 16 |
| V | 20 | 0 | 6.1 | 6.5 | 5 | | 4.5 | 0 | ++ | + | + | + | 10 |
| I' | | 10 | 6 | 5.5 | 5.5 | | 6 | ++ | 0 | + | ++ | + | 12 |
| J' | | 15 | 6.6 | 5.8 | 4.5 | | 5 | + | ++ | ++ | ++ | + | 16 |

TABLE II-continued

| | CONDITIONS OF WELDING AND EVALUATION | | | | | | | QUALITY OF THE ARC | | QUALITY OF WELDING SEAMS | | | |
|---|---|---|---|---|---|---|---|---|---|---|---|---|---|
| | angles | | | | | | | Power of | | | regularity of | | |
| POINTS | Sleeve $\alpha$ | nozzle $\beta$ | v om/mn | ld (mm) | lv (mm) | $\frac{lv}{ld}$ | $v \times \frac{lv}{ld}$ | Penetration | Stability | Weld curvature | Top | seam Reverse | Max. rating 20 |
| K' | | 20 | 6.6 | 6 | 4.5 | | 5 | + | ++ | ++ | ++ | + | 16 |
| L' | | 25 | 6 | 6.4 | 5 | | 4.5 | 0 | ++ | + | ++ | + | 12 |
| W | 25 | 0 | 6 | 7 | 5.5 | | 4.5 | 0 | ++ | + | ++ | + | 12 |
| X | | 10 | | | | | | | | | | | |
| M' | | 15 | 5.4 | 6.5 | 6.5 | | 5.5 | + | ++ | 0 | ++ | 0 | 10 |
| N' | | 20 | 6 | 5.5 | 5.5 | | 6 | ++ | ++ | + | ++ | + | 16 |
| O' | | 25 | 5.4 | 6.5 | 5 | | 4 | 0 | ++ | + | ++ | 0 | 10 |

The results contained in the above tables reveal an extensive concordance between the two series of tests and outline three welding quality zones:

ZONE I: this is the optimum quality zone, delineated by the following points:

$S''_1$:
  $\alpha''_1 = 17.5$ degrees
  $\beta''_1 = 22.5$ degrees
$S''_2$:
  $\alpha''_2 = 12.5$ degrees
  $\beta''_2 = 22.5$ degrees
$S''_3$:
  $\alpha''_3 = 12.5$ degrees
  $\beta''_3 = 12.5$ degrees
$S''_4$:
  $\alpha''_4 = 17.5$ degrees
  $\beta''_4 = 12.5$ degrees In this zone the average evaluation mark reaches 16.4.

ZONE II: very good welding quality. This zone is situated outside of Zone I and is delineated by the following four points:

$S'_1$:
  $\alpha'_1 = 17.5$ degrees
  $\beta'_1 = 27.5$ degrees
$S'_2$:
  $\alpha'_2 = 7.5$ degrees
  $\beta'_2 = 20$ degrees
$S'_3$:
  $\alpha'_3 = 7.5$ degrees
  $\beta'_3 = 15$ degrees
$S'_4$:
  $\alpha'_4 = 17.5$ degrees
  $\beta'_4 = 7.5$ degrees In this zone, the average evaluation mark reaches 15.

ZONE III: of lesser quality but still acceptable. This zone lies outside Zone II and is delineated by the points:

$S_1$:
  $\alpha_1 = 15$ degrees (coinciding with U)
  $\beta_1 = 0$ degrees
$S_2$:
  $\alpha_2 = 15$ degrees
  $\beta_2 = 30$ degrees
$S_3$:
  $\alpha_3 = 5$ degrees (coinciding with R)
  $\beta_3 = 20$ degrees
$S_4$:
  $\alpha_4 = 25$ degrees (coinciding with N)
  $\beta_4 = 20$ degrees In this zone, the average quality evaluation marks are in the order of 13.

Outside Zone III, a zone of good welding quality delineated by points $S_1$, $S_2$, $S_3$ and $S_4$, there are other points such as P,O,S,T,V,W and M where the evaluation marks drop below 13 and are generally situated between 6 and 12. This zone is considered as a zone of sub-standard operational quality.

Other gas combinations may be used for the welding of carbon steel grades. For example, argon may be used for the central gas flow together with a mixture of argon and 15% carbon dioxide for the peripheral flow.

To weld light alloys, the preferred combination of gasses is made up of a 30% argon–70% helium mixture for the central flow and pure argon for the peripheral flow.

In the case of certain applications, electric arc penetration may be improved still more by combining, in the peripheral flow, argon with a limited quantity of a metallurgicaly active gas, like $H_2$ (up to 5%), $CO_2$ (up to 20%), or $O_2$ (up to 5%).

The present invention permits welding of plates of increased thicknesses. Against a given thickness, the electric power requirements are clearly reduced, whereas the welding speed is notably increased.

As an alternative, the outlet rim of the sleeve internal wall 3 may be provided with edges 14 which are made to converge slightly as shown in ghost lines in FIG. 1. This will result in a pneumatic constriction of the electric arc which improves arc penetration still further.

Many variations are possible to the embodiments of the invention as described above without departing from the scope and spirit of this invention, as defined in the appended claims.

What is claimed is:

1. An electric arc welding torch of the type providing a double shielding gas flow, and comprising an axially positioned non-consumable electrode, a sleeve coaxial with said electrode and having an outer wall and an inner wall defining, with the electrode, a first annular passage having a width, measured along a radius, of between 0.5 and 1.5 mm, and a torch nozzle coaxially disposed over said sleeve and having an inner wall defining, with the outer wall of the sleeve, a second annular passage concentric with the first annular passage; wherein the second annular passage is of a generally tapered shape with the outer wall of the sleeve converging at an apex angle of convergence $\alpha$ towards a tip of the electrode and with the inner wall of the nozzle converging at an apex angle of convergence $\beta$; and wherein the values of said angles of convergence $\alpha$ and $\beta$ are selected to satisfy a relation defined by a system of rectangular coordinates whose abscissa represents the values of the angle $\alpha$ and whose ordinate represents the values of the angle $\beta$, with these values being inscribed within a quadrangle defined by its apices $S'_1$, $S'_2$, $S'_3$, and $S'_4$ as follows:

$S'_1$:

α=17.5 degrees
β=27.5 degrees;
S′₂:
α=7.5 degrees
β=20 degrees;
S′₃:
α=7.5 degrees
β=15 degrees; and
S′₄:
α=17.5 degrees
β=7.5 degrees.

2. An electric arc welding torch as defined in claim 1, wherein said values of the angles α and β are selected to be values inscribed within a smaller quadrangle within the first-mentioned quadrangle, and defined by apices S″₁, S″₂, S″₃, and S″₄ as follows:
S″₁:
α=17.5 degrees
β=22.5 degrees;
S″₂:
α=12.5 degrees
β=22.5 degrees;
S″₃:
α=12.5 degrees
β=17.5 degrees; and
S″₄:
α=17.5 degrees
β=12.5 degrees.

3. An electric arc welding torch as defined in claim 1, wherein said sleeve has a ratio of outside diameter to inside diameter in the range between 1.6 and 2.1 at an outlet end of the sleeve.

4. An electric arc welding torch of the type providing a double-shielding gas flow, and comprising an axially positioned non-consumable electrode, a sleeve coaxial with said electrode and having an outer wall and an inner wall defining, with the electrode, a first annular passage having a width, measured along a radius, of between 0.5 and 1.5 mm, and a torch nozzle coaxially disposed over said sleeve and having an inner wall defining, with the outer wall of the sleeve, a second annular passage concentric with the first annular passage; wherein the second annular passage is of a generally tapered shape with the outer wall of the sleeve converging at an angle of convergence α towards a tip of the electrode and with the inner wall of the nozzle converging at an angle of convergence β; wherein said sleeve has a ratio of outside diameter to inside diameter in the range between 1.6 and 2.1 at an outlet end of the sleeve; wherein the ratio of inside diameter of the torch nozzle to outside diameter of the sleeve, determined at the outlet end of the sleeve, is in the range between 1.6 and 2.1; and wherein the values of said angles of convergence α and β are selected to satisfy a relation defined by a system of rectangular coordinates whose abscissa represents the values of the angle α and whose ordinate represents the values of the angle β, with these values being inscribed within a quadrangle defined by its apices S′₁, S′₂, S′₃, and S′₄ as follows:
S′₁:
α=17.5 degrees
β=27.5 degrees;
S′₂:
α=7.5 degrees
β=20 degrees;
S′₃:
α=7.5 degrees
β=15 degrees; and
S′₄:
α=17.5 degrees
β=7.5 degrees.

5. An electric arc welding torch as defined in claim 1, wherein said sleeve has an outlet end surface and said nozzle has an outlet surface, said surfaces being situated substantially in a common plane generally perpendicular to the axis of the torch.

6. An electric arc welding torch as defined in claim 1, wherein said electrode protrudes out of said sleeve a distance between 3 and 15 mm.

7. An electric arc welding torch as defined in claim 6, wherein said distance is between 3 and 6 mm.

8. An electric arc welding torch as defined in claim 1, wherein said outer wall of the sleeve and said inner wall of the nozzle are of a purely conical shape over an axial length of at least 13 mm.

9. An electric arc welding torch as defined in claim 1, wherein the inner wall of the sleeve, at an outlet end of the sleeve, has converging rim means causing sufficient constriction of electric arc penetration from the electrode so as to improve electric arc penetration.

10. An electric arc welding process employing an electric arc welding torch of the type providing a double shielding gas flow and comprising an axially positioned non-consumable electrode, a sleeve coaxial with said electrode and having an outer wall and an inner wall defining, with the electrode, a first annular passage having a radial width, measured along a radius, or between 0.5 and 1.5 mm, and a torch nozzle coaxially disposed over said sleeve and having an inner wall defining, with the outer wall of the sleeve, a second annular passage concentric with the first annular passage; and wherein the second annular passage is of a generally tapered shaped with the outer wall of the sleeve converging at an apex angle of convergence α towards a tip of the electrode and with the inner wall of the nozzle converging at an apex angle of convergence β; and wherein the values of the angles of convergence α and β are selected to satisfy a relation defined by a system of rectangular coordinates whose abscissa represents the values of the angle α and whose ordinate represents the values of the angle β, with these values being inscribed within a quadrangle defined by its apices S′₁, S′₂, S′₃, and S′₄ as follows:
S′₁:
α=17.5 degrees
β=27.5 degrees;
S′₂:
α=7.5 degrees
β=20 degrees;
S′₃:
α=7.5 degrees
β=15 degrees; and
S′₄:
α=17.5 degrees
β=7.5 degrees;
said process comprising
establishing a difference of electric potential between a work piece and the electrode of the welding torch; while
introducing into said first annular passage an inert gas which may contain up to a maximum of 10% hydrogen; and
simultaneously introducing into said second annular passage an inert gas which may contain, mixed therewith, a metallurgically active gas.

11. An electric arc welding process according to claim 10, wherein said workpiece is of carbon steel or stainless steel, and the gas introduced into said first passage is argon gas containing 5% hydrogen, while pure argon gas is used as the gas introduced into the second passage.

12. An electric arc welding process according to claim 10, wherein said workpiece includes light-weight metal alloys to be welded, and the gas introduced into said first passage is a mixture of argon gas containing 70% helium, while the gas introduced into said second passage is pure argon gas.

13. An electric arc welding process employing an electric arc welding torch of the type providing a double shielding gas flow and comprising an axially nonconsumable electrode, a sleeve coaxial with said electrode and having an outer wall and an inner wall defining, with the electrode, a first annular passage having a radial width, measured along a radius, of between 0.5 and 1.5 mm, and a torch nozzle coaxially disposed over said sleeve and having an inner wall defining, with the outer wall of the sleeve, a second annular passage concentric with the first annular passage; and wherein the second annular passage is of a generally tapered shape with the outer wall of the sleeve converging at an angle of convergence $\alpha$ towards a tip of the electrode and with the inner wall of the nozzle converging at an angle of convergence $\beta$; and wherein the values of the angles of convergence $\alpha$ and $\beta$ are selected to satisfy a relation defined by a system of rectangular coordinates whose abscissa represents the values of the angle $\alpha$ and whose ordinate represents the values of the angle $\beta$, with these values being inscribed within a quadrangle defined by its apices $S'_1$, $S'_2$, $S'_3$, and $S'_4$ as follows:

$S'_1$:
 $\alpha = 17.5$ degrees
 $\beta = 27.5$ degrees;

$S'_2$:
 $\alpha = 7.5$ degrees
 $\beta = 20$ degrees;

$S'_3$:
 $\alpha = 7.5$ degrees
 $\beta = 15$ degrees; and $S'_4$:
 $\alpha = 17.5$ degrees
 $\beta = 7.5$ degrees;

said process comprising
 establishing a difference of electric potential between a work piece and the electrode of the welding torch; while
 introducing into said first annular passage an inert gas which may contain up to a maximum of 10% hydrogen; and
 simultaneously introducing into said second annular passage an inert gas which may contain, mixed therewith, a metallurgically active gas, wherein said gasses introduced into the first and second annular passages are provided at flow rates of between $$1.5/\sqrt{d_{Ar}} \text{ and } 4/\sqrt{d_{Ar}}$$

liters per minute, where $d_{Ar}$ is the specific gravity of the gas introduced relative to argon.

14. An electric arc welding process as defined in claim 13, wherein the gas is introduced into the second annular passage at a flow rate on the order $$D_3/\sqrt{d_{Ar}}$$

where $D_3$ is the inside diameter of the nozzle at its outlet, as expressed in millimeters.

* * * * *